(12) United States Patent
Matsushita et al.

(10) Patent No.: US 11,988,506 B2
(45) Date of Patent: May 21, 2024

(54) ERROR IDENTIFICATION METHOD FOR MACHINE TOOL, NON-TRANSITORY COMPUTER-READABLE STORAGE MEDIUM, AND MACHINE TOOL

(71) Applicant: OKUMA CORPORATION, Niwa-Gun (JP)

(72) Inventors: Tetsuya Matsushita, Niwa-Gun (JP); Takuya Kojima, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 182 days.

(21) Appl. No.: 17/810,883

(22) Filed: Jul. 6, 2022

(65) Prior Publication Data
US 2023/0010236 A1 Jan. 12, 2023

(30) Foreign Application Priority Data

Jul. 8, 2021 (JP) ................................. 2021-113740

(51) Int. Cl.
*G01B 5/012* (2006.01)
*B23Q 15/12* (2006.01)

(52) U.S. Cl.
CPC ............. *G01B 5/012* (2013.01); *B23Q 15/12* (2013.01)

(58) Field of Classification Search
CPC ...... G01B 5/012; G01B 21/042; B23Q 15/12; G05B 2219/50137; G05B 19/401; G05B 19/404; G05B 2219/35408
See application file for complete search history.

(56) References Cited

U.S. PATENT DOCUMENTS

| | | | | |
|---|---|---|---|---|
| 6,463,667 B1 * | 10/2002 | Ushio | ................... | G01B 21/045 73/1.79 |
| 6,493,957 B1 * | 12/2002 | Takatsuji | ............. | G01B 5/0014 73/1.79 |
| 7,900,367 B2 * | 3/2011 | Sutherland | ........... | G01B 21/042 33/502 |
| 8,494,800 B2 * | 7/2013 | Matsushita | ............ | B23Q 17/22 702/95 |
| 9,778,645 B2 * | 10/2017 | Shimizu | ............... | G05B 19/404 |

(Continued)

FOREIGN PATENT DOCUMENTS

| | | | | |
|---|---|---|---|---|
| DE | 102022206958 A1 * | 1/2023 | ............. | B23Q 15/12 |
| DE | 102022206959 A1 * | 1/2023 | ............. | B23Q 15/12 |

(Continued)

*Primary Examiner* — Yaritza Guadalupe-McCall
(74) *Attorney, Agent, or Firm* — BURR PATENT LAW, PLLC

(57) ABSTRACT

An error identification method includes: installing a calibrator including a sphere row A and a sphere row B in which a plurality of spheres are linearly aligned in a direction perpendicular to the sphere row A on a table such that the sphere row A and the sphere row B are approximately parallel to respective two of the translational axes and measuring positions of a plurality of spheres of the sphere row A and the sphere row B using a position measurement sensor tool; rotating the calibrator to a plurality of angles around a normal direction on the upper surface of the table to install on the table and measuring each position of the plurality of spheres of the sphere row A and the sphere row B; and identifying an error of the translational axis based on measured values in the installing and the rotating.

13 Claims, 11 Drawing Sheets

(56) References Cited

U.S. PATENT DOCUMENTS

| | | | | |
|---|---|---|---|---|
| 10,357,863 B2* | 7/2019 | Matsushita | ......... | B23Q 17/2485 |
| 10,942,020 B2* | 3/2021 | Meile | ..................... | G01B 5/008 |
| 11,338,407 B2* | 5/2022 | Kojima | ................ | G05B 19/401 |
| 11,662,195 B2* | 5/2023 | Kanbe | ................... | G01B 11/005 |
| | | | | 356/614 |
| 11,774,227 B2* | 10/2023 | Kiyotani | .............. | G01B 5/0004 |
| | | | | 33/502 |
| 2011/0040523 A1* | 2/2011 | Matsushita | .......... | G01B 21/045 |
| | | | | 702/152 |
| 2014/0345359 A1* | 11/2014 | Somerville | ............ | G01B 5/008 |
| | | | | 73/1.79 |
| 2015/0160049 A1* | 6/2015 | Oki | ......................... | G01B 5/20 |
| | | | | 702/97 |
| 2023/0010236 A1* | 1/2023 | Matsushita | ............. | B23Q 15/12 |
| 2023/0010557 A1* | 1/2023 | Matsushita | ............. | B23Q 15/12 |
| 2023/0069773 A1* | 3/2023 | Kondo | .................. | B23Q 15/12 |

FOREIGN PATENT DOCUMENTS

| | | | | | |
|---|---|---|---|---|---|
| EP | 3367056 | A1 | * | 8/2018 | ............ B23Q 17/22 |
| JP | H06-138921 | A | | 5/1994 | |
| JP | 2007-101279 | A | | 4/2007 | |
| JP | 2007101279 | A | * | 4/2007 | |
| JP | 2011-038902 | A | | 2/2011 | |
| JP | 2016154039 | A | * | 8/2016 | ............ B23Q 17/22 |
| JP | 2020-046301 | A | | 3/2020 | |
| JP | 2020046301 | A | * | 3/2020 | |

* cited by examiner

ERROR IDENTIFICATION METHOD FOR MACHINE TOOL, NON-TRANSITORY COMPUTER-READABLE STORAGE MEDIUM, AND MACHINE TOOL

CROSS REFERENCE TO RELATED APPLICATION

This application claims the benefit of Japanese Patent Application Number 2021-113740 filed on Jul. 8, 2021, the entirety of which is incorporated by reference.

FIELD OF THE INVENTION

The disclosure relates to a method for identifying a geometric error in a machine tool, such as a four-axis-control horizontal machining center, a non-transitory computer-readable storage medium storing an error identification program for performing the method, and a machine tool configured to perform the method.

BACKGROUND OF THE INVENTION

FIG. 1 is a schematic diagram of a four-axis-control horizontal machining center having three translational axes and one rotation axis. A spindle head 2 is allowed to perform a motion of two degrees of freedom for translation with respect to a bed 1 in an X-axis and a Y-axis, which are the translational axes and are orthogonal to one another. A table 3 is allowed to perform a motion of one degree of freedom for rotation around the Y-axis in a B-axis, which is the rotation axis. Further, the table 3 is allowed to perform a motion of one degree of freedom for translation with respect to the bed 1 in a Z-axis, which is orthogonal to the X-axis and the Y-axis. Accordingly, the spindle head 2 has three degrees of freedom for translation and one degree of freedom for rotation with respect to the table 3. Servomotors, which are controlled by a numerical control unit, drive respective axes. A workpiece is secured to the table 3, a tool is mounted on the spindle head 2 and rotated around an axis parallel to the Z-axis, thus machining the workpiece into a given shape.

As a main factor of a motion error of the four-axis-control horizontal machining center, there are geometric errors of the axes alone, such as a positioning error and a straightness error of the respective translational axes.

Furthermore, there are geometric errors between the respective axes, such as a squareness error between the translational axes, an error in the center position of the rotation axis, and an inclination error of the rotation axis. For example, in the four-axis-control horizontal machining center of FIG. 1, there are three geometric errors of the squareness between the X-axis and the Y-axis, the squareness between the Y-axis and the Z-axis, and the squareness between the Z-axis and the X-axis as inter-axis geometric errors related to the translational axes. There are the X-direction error of the B-axis center position, the Z-direction error of the B-axis center position, the squareness between the B-axis and the X-axis, and the squareness between the B-axis and the Z-axis as inter-axis geometric errors related to the rotation axis.

When the geometric errors exist, they become the motion errors of the machine, which is transferred to the shape of a workpiece, thus deteriorating the shape and dimension accuracy of the workpiece.

As a countermeasure against the situation, a method for manufacturing or adjusting so as to decrease the geometric errors and a method for correcting and controlling the error of a position of the tool by the geometric errors are generally practiced. In order to perform the correction control, the geometric errors that are internally present in the machine should be measured or identified.

As a method for identifying single axis geometric errors, JP 1994-138921 A discloses a method in which the shape of a master block is measured using a touch trigger probe and based on shape data of the master block which is preliminary input and the measurement result, a straightness error and a squareness error of a translational axis are identified.

JP 2007-101279 A discloses a method in which, for a total of seven directions of diagonal four directions of a rectangular parallelepiped shape defined by an X-axis, a Y-axis, and a Z-axis and respective axial directions, lengths are measured using a length reference device whose length is already-known and based on the measurement result, a correction coefficient of a positioning error and a squareness error of each axis is estimated.

Furthermore, JP 2020-46301 A discloses a method in which, using an arm on which a plurality of spheres are secured and a reference device including two rotation mechanisms that rotate the arm, distances between the spheres are measured, and a scaling component of positioning errors of three translational axes and squarenesses between the three translational axes are identified.

On the other hand, as a method for identifying inter-axis geometric errors, the inventor has proposed a method disclosed in JP 2011-038902 A. With the method, a table is indexed to a plurality of angles of rotation and inclination by rotation axes, the center position of a sphere secured on the table is each measured using a touch trigger probe mounted on a spindle, and inter-axis geometric errors are identified from the obtained measured values.

In JP 1994-138921 A, when the touch trigger probe and the spindle are parallel, the touch trigger probe and the spindle interfere with the master block. Accordingly, there is a problem that the measurement in the axis direction parallel to the touch trigger probe cannot be performed and the single axis geometric error of the axis and the inter-axis geometric error related to the axis cannot be identified. Although the geometric errors related to the axis can be measured by changing the direction of the touch trigger probe, a mechanism that changes the direction of the touch trigger probe is necessary, resulting in a problem that an installation jig of the touch trigger probe becomes expensive. Further, there is also a problem that an operation for changing the direction of the touch trigger probe is a labor for an operator, and if the angle is changed to an incorrect direction, a collision accident may be caused.

In JP 2007-101279 A and JP 2020-46301 A, in a four-axis-control horizontal machining center in which a spindle is mounted in a perpendicular direction with respect to a table as illustrated in FIG. 1, the reference device is installed in a state where the posture of the reference device is basically perpendicular to the table, that is, parallel to the gravity, and the reference device is inclined around an axis perpendicular to the gravity. Accordingly, the direction of the gravity applied to the reference device is changed, and the reference device deforms under its own weight, resulting in a problem that the measurement cannot be accurately performed. Furthermore, an inclination mechanism of a jig for changing the direction of the reference device is necessary, and the inclination mechanism needs to be a structure that bears a relative gravity direction change, resulting in a problem that the jig becomes expensive. Further, there is also a problem that an operation for changing the inclination of the reference device is difficult for an operator because the gravity direction is changed.

On the other hand, the touch trigger probe is a device that outputs a signal when it comes into contact with an object. When coming into contact with an object, the touch trigger probe outputs a signal, and a control device acquires a detecting position of a position detector of the translational axis at the time of detecting the signal, thus measuring the position of the object. That is, the measurement result by the touch trigger probe is affected by single axis geometric errors, namely, positioning error and straightness of each translational axis. In view of this, in the methods of JP 1994-138921 A and JP 2011-038902 A, there is a problem that the inter-axis geometric errors cannot be accurately identified when the single axis geometric errors of each translational axis are large.

Therefore, it is an object of the disclosure to provide an error identification method for a machine tool, a non-transitory computer-readable storage medium storing an error identification program, and a machine tool that allow accurately identifying a single axis geometric error of a translational axis without putting an excessive burden on an operator.

SUMMARY OF THE INVENTION

In order to achieve the above-described object, there is provided an error identification method for a machine tool for identifying an error according to a first configuration of the disclosure. The machine tool includes a table configured to secure a workpiece and/or a jig, a spindle configured to rotate a mounted tool around an axis line parallel to an upper surface of the table, and three translational axes orthogonal to one another and configured to relatively move the spindle with respect to the table. The error identification method includes: installing a calibrator including a sphere row A in which a plurality of spheres are linearly aligned and a sphere row B in which a plurality of spheres are linearly aligned in a direction perpendicular to the sphere row A on the table such that the sphere row A, and the sphere row B are approximately parallel to respective two of the translational axes and measuring positions of a plurality of spheres of the sphere row A and the sphere row B using a position measurement sensor tool mounted on the spindle; rotating the calibrator to a plurality of angles around a normal direction on the upper surface of the table to install on the table and measuring each position of the plurality of spheres of the sphere row A and the sphere row B using the position measurement sensor tool; and identifying an error of the translational axis based on measured values in the installing and the rotating.

In another aspect of the first configuration of the disclosure, which is in the above configuration, the identifying includes identifying a positioning error of the translational axis and a squareness error between the translational axes.

In another aspect of the first configuration of the disclosure, which is in the above configuration, the identifying includes identifying a positioning error and a straightness error of the two of the translational axes selected in the installing, a scaling component of a positioning error of one of the translational axes other than the two of the translational axes, and three squareness errors between the translational axes.

In order to achieve the above-described object, a second configuration of the disclosure is an error identification method for a machine tool for identifying an error. The machine tool includes a table configured to secure a workpiece and/or a jig, a spindle configured to rotate a mounted tool around an axis line parallel to an upper surface of the table, three translational axes orthogonal to one another and configured to relatively move the spindle with respect to the table, and a rotation axis configured to rotate the table around a normal vector of the upper surface of the table. The error identification method includes a preparing of installing a calibrator including a sphere row A in which a plurality of spheres are linearly aligned and a sphere row B in which a plurality of spheres are linearly aligned in a direction perpendicular to the sphere row A on the table; a parallel measuring of indexing the rotation axis such that the sphere row A and the sphere row B are approximately parallel to respective two of the translational axes and measuring positions of a plurality of spheres of the sphere row A and the sphere row B using a position measurement sensor tool mounted on the spindle; a rotation measuring of indexing the rotation axis to a plurality of angles such that the sphere row A is non-parallel to any of the translational axes and measuring each position of a plurality of spheres of the sphere row A and the sphere row B using the position measurement sensor tool; and a translational axis error identifying of identifying an error of the translational axis based on measured values in the parallel measuring and the rotation measuring.

In another aspect of the second configuration of the disclosure, which is in the above configuration, the translational axis error identifying includes identifying a positioning error of the translational axis and a squareness error between the translational axes.

In another aspect of the second configuration of the disclosure, which is in the above configuration, the translational axis error identifying includes identifying a positioning error and a straightness error of the two of the translational axes selected in the parallel measuring, a scaling component of a positioning error of one of the translational axes other than the two of the translational axes, and three squareness errors between the translational axes.

In order to achieve the above-described object, a third configuration of the disclosure is an error identification program for a machine tool for causing a numerical control unit of a machine tool to perform the error identification method for the machine tool. The machine tool includes a table configured to secure a workpiece and/or a jig, a spindle configured to rotate a mounted tool around an axis line parallel to an upper surface of the table, three translational axes orthogonal to one another and configured to relatively move the spindle with respect to the table, and a rotation axis configured to rotate the table around a normal vector of the upper surface of the table.

In order to achieve the above-described object, a fourth configuration of the disclosure is a machine tool including a table configured to secure a workpiece and/or a jig; a spindle configured to rotate a mounted tool around an axis line parallel to an upper surface of the table; three translational axes orthogonal to one another and configured to relatively move the spindle with respect to the table; and a rotation axis configured to rotate the table around a normal vector of the upper surface of the table. The machine tool includes a parallel measuring unit, in a state where a position measurement sensor tool is mounted on the spindle and a calibrator including a sphere row A in which a plurality of spheres are linearly aligned and a sphere row B in which a plurality of spheres are linearly aligned in a direction perpendicular to the sphere row A is installed on the table, the parallel measuring unit being configured to index the rotation axis such that the sphere row A and the sphere row B are approximately parallel to respective two of the translational axes and measure positions of a plurality of spheres of the sphere row A and the sphere row B using the position measurement sensor tool; a rotation measuring unit configured to index the rotation axis to a plurality of angles such that the sphere row A is non-parallel to any of the translational axes and measure each position of a plurality of spheres of the sphere row A and the sphere row B using the position measurement sensor tool; and a translational axis error identifying unit configured to identify an error of the translational axis based on measured values by the parallel measuring unit and the rotation measuring unit.

In order to achieve the above-described object, a fifth configuration of the disclosure is an error identification method for a machine tool for identifying an error. The machine tool includes a table configured to secure a workpiece and/or a jig, a spindle configured to rotate a mounted tool around an axis line parallel to an upper surface of the table, three translational axes orthogonal to one another and configured to relatively move the spindle with respect to the table, and a rotation axis configured to rotate the table around a normal vector of the upper surface of the table. The error identification method includes: a preparing of installing a calibrator including a sphere row A in which a plurality of spheres are linearly aligned and a sphere row B in which a plurality of spheres are linearly aligned in a direction perpendicular to the sphere row A on the table; a parallel measuring of indexing the rotation axis such that the sphere row A and the sphere row B are approximately parallel to respective two of the translational axes and measuring positions of a plurality of spheres of the sphere row A and the sphere row B using a position measurement sensor tool mounted on the spindle; a rotation measuring of indexing the rotation axis to a plurality of angles such that the sphere row A is non-parallel to any of the translational axes and measuring each position of a plurality of spheres of the sphere row A and the sphere row B using the position measurement sensor tool; and an arc measuring of indexing the rotation axis sequentially to a plurality of angles such that a sphere of the calibrator draws an arc trajectory and measuring each center position of at least one sphere of the calibrator; and an error identifying of identifying an error of the translational axis and an error of the rotation axis based on measured values in the parallel measuring, the rotation measuring, and the arc measuring.

In another aspect of the fifth configuration of the disclosure, which is in the above configuration, the error identifying includes identifying a positioning error of the translational axis, a squareness error between the translational axes, and a center position error of the rotation axis.

In another aspect of the fifth configuration of the disclosure, which is in the above configuration, the error identifying includes identifying a positioning error and a straightness error of the two of the translational axes selected in the parallel measuring, a scaling component of a positioning error of one of the translational axes other than the two of the translational axes, three squareness errors between the translational axes, a center position error of the rotation axis, and an inclination error of the rotation axis are identified.

In order to achieve the above-described object, a sixth configuration of the disclosure is a non-transitory computer-readable storage medium storing an error identification program for a machine tool for causing a numerical control unit of a machine tool to perform the error identification method for the machine tool. The machine tool includes a table configured to secure a workpiece and/or a jig, a spindle configured to rotate a mounted tool around an axis line parallel to an upper surface of the table, three translational axes orthogonal to one another and configured to relatively move the spindle with respect to the table, and a rotation axis configured to rotate the table around a normal vector of the upper surface of the table.

In order to achieve the above-described object, a seventh configuration of the disclosure is a machine tool including a table configured to secure a workpiece and/or a jig; a spindle configured to rotate a mounted tool around an axis line parallel to an upper surface of the table; three translational axes orthogonal to one another and configured to relatively move the spindle with respect to the table; and a rotation axis configured to rotate the table around a normal vector of the upper surface of the table. The machine tool includes: a parallel measuring unit, in a state where a position measurement sensor tool is mounted on the spindle and a calibrator including a sphere row A in which a plurality of spheres are linearly aligned and a sphere row B in which a plurality of spheres are linearly aligned in a direction perpendicular to the sphere row A is installed on the table, the parallel measuring unit being configured to index the rotation axis such that the sphere row A and the sphere row B are approximately parallel to respective two of the translational axes and measure positions of a plurality of spheres of the sphere row A and the sphere row B using the position measurement sensor tool; a rotation measuring unit configured to index the rotation axis to a plurality of angles such that the sphere row A is non-parallel to any of the translational axes and measure each position of a plurality of spheres of the sphere row A and the sphere row B using the position measurement sensor tool; an arc measuring unit configured to index the rotation axis sequentially to a plurality of angles such that a sphere of the calibrator draws an arc trajectory and measure each center position of at least one sphere of the calibrator; and an error identifying unit configured to identify an error of the translational axis and an error of the rotation axis based on measured values by the parallel measuring unit, the rotation measuring unit, and the arc measuring unit.

In the disclosure, the term of "approximately parallel" means a gist of allowing a slight error including strict parallelism.

With the disclosure, in the machine tool in which the axis line of the spindle is parallel to the upper surface of the table, the single axis geometric errors, namely, positioning errors and straightnesses of the translational axes can be identified by using a relatively inexpensive reference device that does not have an inclination mechanism. Since a change of the direction of the reference device is completed only by a rotation around the gravity axis, the single axis geometric errors of the translational axes can be accurately identified without putting an excessive burden on an operator.

Especially with the second to fourth configurations of the disclosure, in addition to the above effects, by using the four-axis-control machine tool in which the table is turnable by the rotation axis, a sequence of measurements can be automatically performed. Accordingly, the identification of the single axis geometric errors of the translational axes can be automatically performed without knowledge or measurement skills of a machine operator.

Especially with the fifth to seventh configurations of the disclosure, in addition to the above effects, by using the four-axis-control machine tool in which the table is turnable by the rotation axis, in addition to the single axis geometric errors, namely, positioning errors and straightnesses of the translational axes, the inter-axis geometric errors, namely, squarenesses between the translational axes, center errors of the rotation axis, and an inclination error of the rotation axis can be simultaneously identified. Further, the accurate identification of the inter-axis geometric errors is allowed without being affected by the single axis geometric errors of the translational axes. Furthermore, the simultaneous identification of the single axis geometric errors of the translational axes and the inter-axis geometric errors can be automatically performed without knowledge or measurement skills of a machine operator.

DETAILED DESCRIPTION OF THE INVENTION

The following describes embodiments of the disclosure based on the drawings.

First, Embodiment 1 is explained below.

Figure 1:
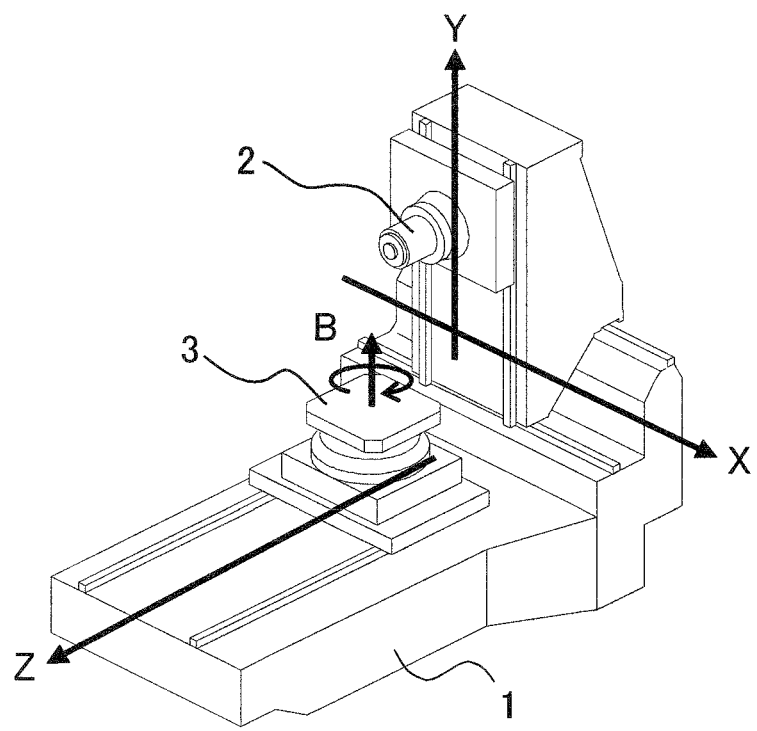
FIG. 1 is a schematic diagram of a four-axis-control horizontal machining center.

In the embodiment 1, one example of a machine tool that performs an error identification method of the disclosure is the four-axis-control horizontal machining center of FIG. 1 described above. Therefore, overlapping descriptions are omitted. The four-axis-control horizontal machining center includes a parallel measuring unit, a rotation measuring unit, and a translational axis error identifying unit, and performs the error identification method of the disclosure in accordance with an error identification program stored in a numerical control unit. The following describes a procedure of the error identification method according to first and second configurations based on a flowchart in FIG. 2. However, in the first configuration, a three-axis-control horizontal machining center without a B-axis that is a rotation axis in the four-axis-control horizontal machining center of FIG. 1 may be used.

Figure 3:
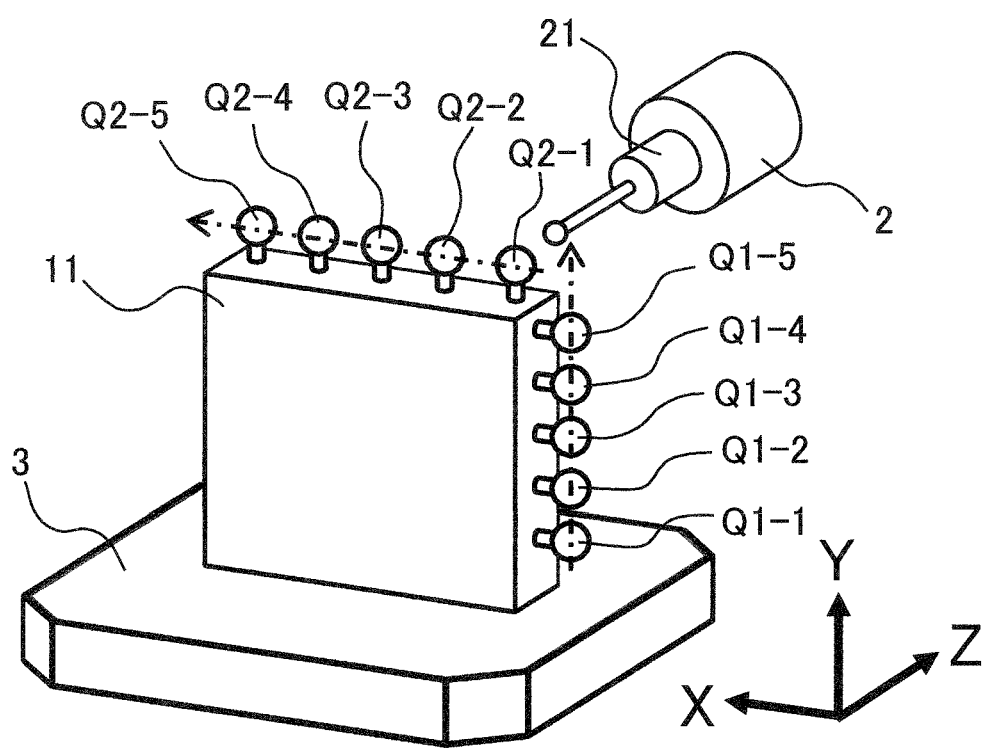
FIG. 3 is a schematic diagram of one configuration of a touch trigger probe and a ball plate.

In Step (hereinafter referred to as simply "S") 1, as illustrated in FIG. 3, a touch trigger probe 21 is mounted on a spindle head 2, and a ball plate 11 that is a calibrator is attached to the upper surface of a table 3. S1 is a preparing step of the second configuration.

A sphere row Q1, that is regarded as sphere row A, of spheres Q1-1 to Q1-5 is linearly aligned and secured on a side surface of the ball plate 11. When the ball plate 11 is installed on the table 3, the sphere row Q1 is approximately parallel to an upper surface normal vector of the table 3, that is, a Y-axis and the B-axis. A B-axis angle at this time is 0°.

Furthermore, a sphere row Q2, that is regarded as sphere row B, of spheres Q2-1 to Q2-5 is linearly aligned in a perpendicular direction with respect to the sphere row Q1 and secured on the upper surface of the ball plate 11. When the ball plate 11 is attached to the table 3, the ball plate 11 is attached such that the sphere row Q2 is approximately parallel to an X-axis. The center position of each sphere is calibrated with a three-dimensional measuring machine or the like, and center position three-dimensional coordinates of each sphere are already-known.

Figure 4:
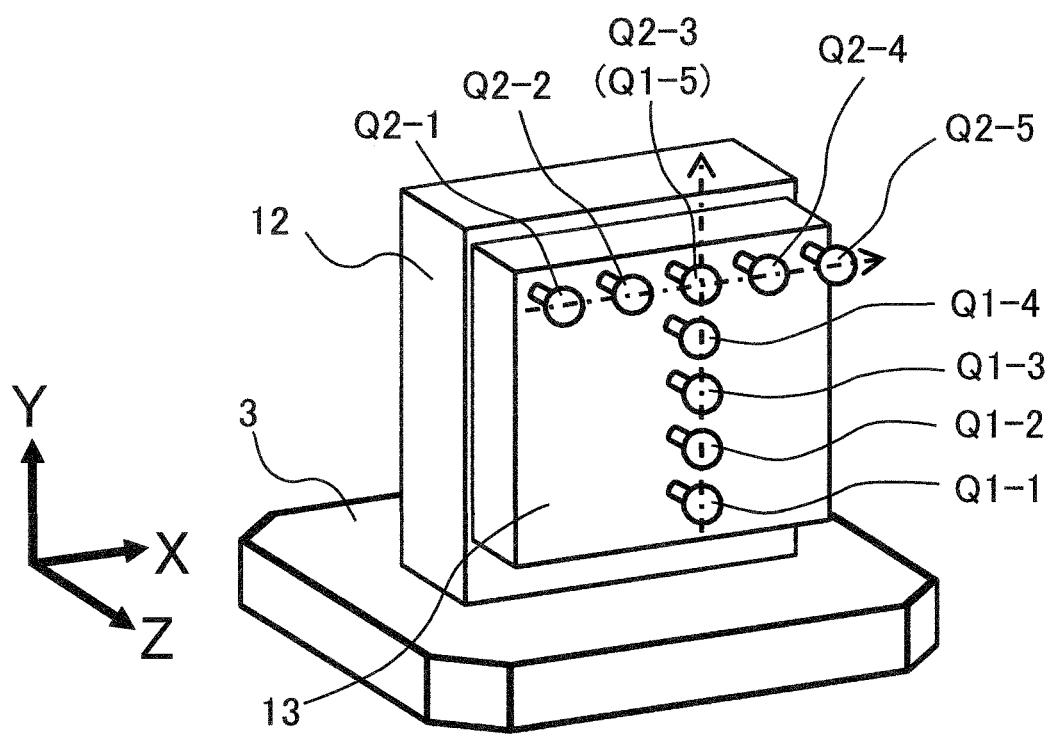
FIG. 4 is a schematic diagram of another configuration of a ball plate.

An example of another configuration of the calibrator is a ball plate 13 as illustrated in FIG. 4. An angle plate jig 12 is attached to the upper surface of the table 3, and the ball plate 13 is attached to a side surface of the angle plate jig 12. On the ball plate 13, the sphere row Q1 of the spheres Q1-1 to Q1-5 and the sphere row Q2 of the spheres Q2-1 to Q2-5 are secured on an identical surface, that is X-Y plane, and the third sphere Q2-3 in the sphere row Q2 doubles as the fifth sphere Q1-5 in the sphere row Q1.

Figure 5:
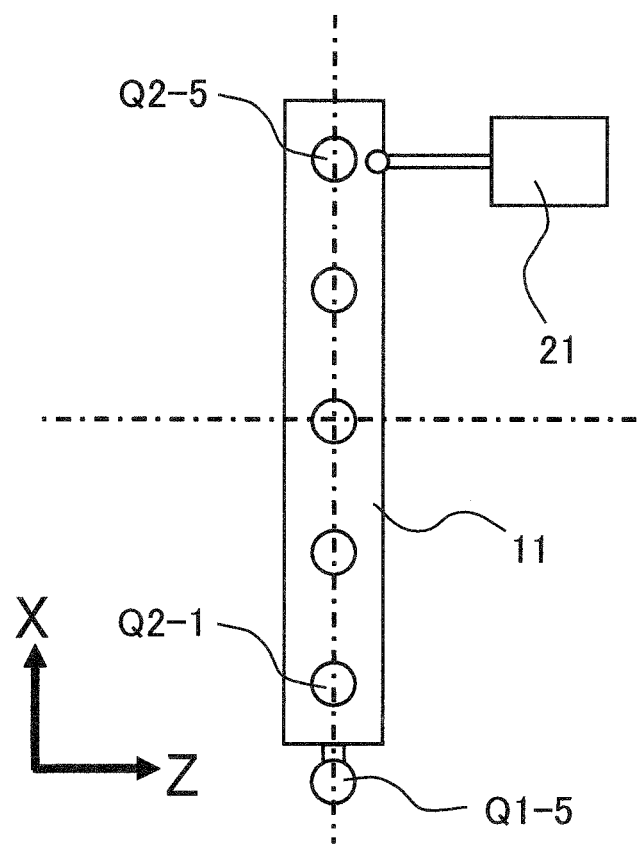
FIG. 5 is a schematic diagram of a position of the ball plate in a parallel direction measurement.

Next, in S2, a parallel measurement of the ball plate 11 is performed. S2 is a parallel measuring step of the first and second configurations. Here, as illustrated in FIG. 5, a measurement of the center position of each sphere in the sphere row Q1 and the sphere row Q2 is performed in a state where the sphere row Q2 of the ball plate 11 is parallel to the X-axis. Here, the sphere row Q1 is parallel to the Y-axis.

Figure 6:
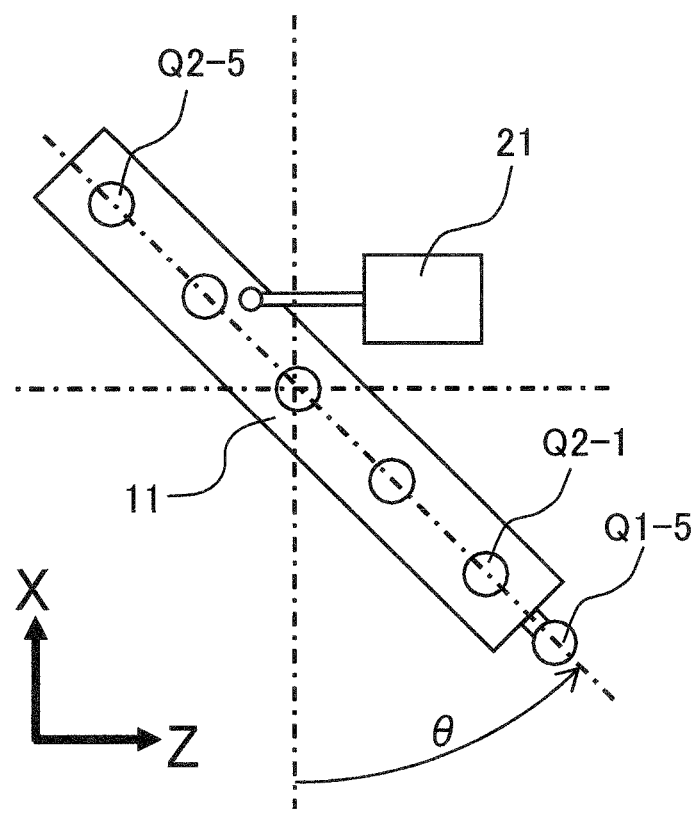
FIG. 6 is a schematic diagram of a position of the ball plate in a diagonal direction measurement.

Next, in S3, an indexing measurement of the ball plate 11 is performed. S3 is a rotation measuring step of the first and second configurations. Here, as illustrated in FIG. 6, a measurement of the center position of each sphere in the sphere row Q1 and the sphere row Q2 is performed by indexing the B-axis angle to θ such that the sphere row Q2 of the ball plate 11 is in a diagonal direction of a ZX plane. The B-axis angle is indexed to two or more angles of, for example, θ1=−45° and θ2=−135° to perform the measurement at the respective angles. When all the spheres in the sphere row Q2 cannot be measured by the relationship between the range of motion of a Z-axis and the center position of the B-axis, the absolute value of θ is set to a smaller value.

Here, a case where the rotation measurement is performed using the B-axis has been described. However, for a three-axis-control horizontal machining center without the B-axis, the rotation measurement may be performed by changing the direction of the ball plate 11 itself only by the angle θ to install on the table 3 or by attaching the ball plate 11 to the table 3 via a jig including a rotation mechanism and changing the direction of the ball plate 11 only by the angle θ using the rotation mechanism of the jig.

Next, in S4, the measured values of S2 and S3 are used to perform an identification calculation of the geometric errors of the translational axes. S4 is a translational axis error identifying step of the first and second configurations.

Figure 7:
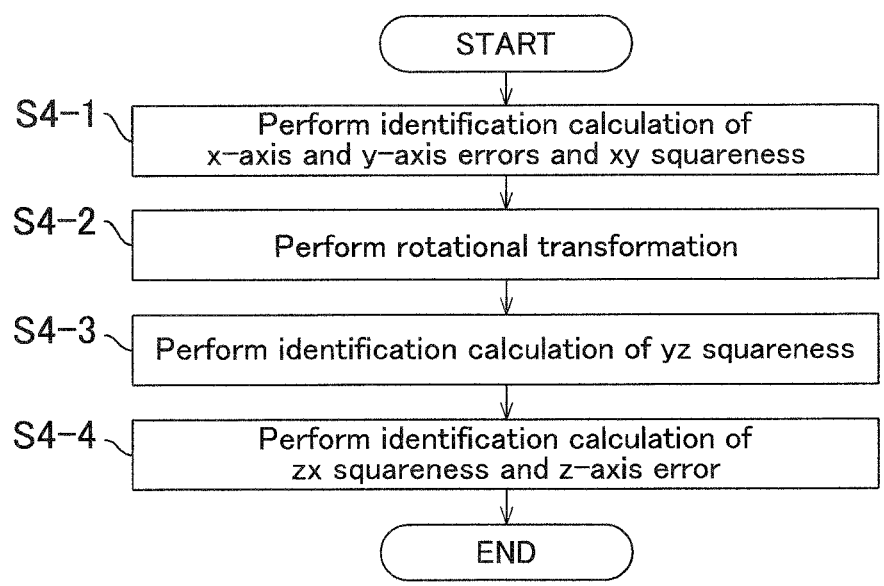
FIG. 7 is a detailed flowchart of an identification calculation of translational axis geometric errors.

The details of S4 will be described based on a flowchart in FIG. 7.

First, in S4-1, a positioning error and a straightness of the X-axis, a positioning error and a straightness of the Y-axis, and a squareness between the X-axis and the Y-axis are identified.

A measurement error vector of each sphere DPki=(dXPki, dYPki, dZPki) is expressed by the following formula, where MOki=(XMki, YMki, ZMki) denotes a calibration value vector of the center position of each sphere Qk-i (k=1 to 2, i=1 to 5) of the ball plate 11 and PPki=(XPki, YPki, ZPki) denotes a center position measured value vector of each sphere Qk-i in S2. Here, the calibration value vector MOki may be corrected according to the temperature of the ball plate 11.

$$DPki=PPki-PPk1-(MOki-MOk1) \quad [\text{Math. 1}]$$

An X-axis positioning error EXX(x) is obtained by the following formula, where FXX(x) denotes an n-th approximated curve of dXP2i.

$$EXX(x)=FXX(x) \quad [\text{Math. 2}]$$

An X-axis straightness Y component EYX(x) is obtained by the following formula, where SYX(x) and FYX(x) respectively denote a least squares straight line and an n-th approximated curve (n≥2) of dYP2i.

$$EYX(x)=FYX(x)-SYX(x) \quad [\text{Math. 3}]$$

An X-axis straightness Z component EZX(x) is obtained by the following formula, where SZX(x) and FZX(x) respectively denote a least squares straight line and an n-th approximated curve (n≥2) of dZP2i.

$$EZX(x)=FZX(x)-SZX(x) \quad [\text{Math. 4}]$$

A Y-axis positioning error EYY(y) is obtained by the following formula, where FYY(y) denotes an n-th approximated curve of dYP1i.

$$EYY(y)=FYY(y) \quad [\text{Math. 5}]$$

A Y-axis straightness Z component EZY(y) is obtained by the following formula, where SZY(y) and FZY(y) respectively denote a least squares straight line and an n-th approximated curve (n≥2) of dZP1i.

$$EZY(y)=FZY(y)-SZY(y) \quad [\text{Math. 6}]$$

A Y-axis straightness X component EXY(y) is obtained by the following formula, where SXY(y) and FXY(y) respectively denote a least squares straight line and an n-th approximated curve (n≥2) of dXP1i.

$$EXY(y)=FXY(y)-SXY(y) \quad [\text{Math. 7}]$$

An XY squareness ECXY is obtained by the following formula, where AX denotes an inclination of SYX(x) and AY denotes an inclination of SXY(y).

$$ECXY=AX+AY \quad [\text{Math. 8}]$$

Next, in S4-2, the measured values of the rotation measurement in S3 are rotationally transformed on an XY plane.

When RB (θ) denotes a matrix to rotate around the Y-axis only by the angle θ and PDkji=(XDkji, YDkji, ZDkji) denotes a center position measured value vector of the sphere Qk-i (k=1 to 2, i=1 to 5) in the rotation measurement at a j-th angle θj, a measured value vector after center position rotation RDkji in which PDkji is rotated around the Y-axis only by -θj is expressed by the following formula.

$$RDkji=RB(\theta j)*PDkji \quad [\text{Math. 9}]$$

Furthermore, considering the calibration value vector MOki of the center position of each sphere Qk-i (k=1 to 2, i=1 to 5), a measurement error vector after rotation of each sphere DDkji=(dXDkji, dYDkji, dZDkji) is expressed by the following formula.

$$DDkji=RDkji-RDkj1-(MOki-MOk1) \quad [\text{Math. 10}]$$

Next, in S4-3, a squareness between the Y-axis and the Z-axis is obtained.

A squareness error EVj between two least squares straight lines is obtained by the following formula, where CZj denotes an inclination of the least squares straight line of dZD2ji obtained in S4-2 and CXj denotes an inclination of the least squares straight line of dxD1ji.

$$EVj=CZj+CXj \quad [\text{Math. 11}]$$

A relationship of the squareness error EVj with respect to the XY squareness ECXY and a YZ squareness EAYZ is expressed by the following formula.

$$EVj=\cos\theta j*EAYZ+\sin\theta j*ECXY \quad [\text{Math. 12}]$$

Accordingly, the YZ squareness EAYZ is obtained by solving the above formula using ECXY obtained in S4-1. Here, since θ1=−45° and θ2=−135°, the average value of the values obtained at the respective angles may be defined as EAYZ.

Next, in S4-4, a squareness between the Z-axis and the X-axis and a scaling (gradient) component of a positioning error of the Z-axis are obtained.

A scaling component dLji of an error of an inter-center distance between the center of the sphere Q2-$i$ (i=1 to 5) and the center of the sphere Q2-1 in the rotation measurement at the j-th angle θj is obtained by the following formula.

$$dLji=(dXDji-dXDj1)/(XMi-XM1) \quad [\text{Math. 13}]$$

A relational expression of a ZX squareness EBZX, a Z-axis positioning error scaling component KZ with respect to dLji is expressed by the following formula. By solving it as a simultaneous equation, KZ and EBZX can be obtained.

$$dLji=\cos^2\theta j*KZ-\sin\theta j*\cos\theta j*EBZX \quad [\text{Math. 14}]$$

With the above configurations, in the four-axis-control horizontal machining center including the table 3 configured to secure a workpiece and/or a jig, the spindle head 2 (spindle) configured to rotate a mounted tool around an axis line parallel to the upper surface of the table 3, and the three X-axis, Y-axis, and Z-axis (translational axes) orthogonal to one another and configured to relatively move the spindle head 2 with respect to the table 3, the following advantages can be achieved. That is, by using a relatively inexpensive ball plate 11 or 13 (reference device) that does not have an inclination mechanism, single axis geometric errors (positioning errors and straightnesses) of the X-axis, the Y-axis, and the Z-axis that are the translational axes can be identified. Since a change of the direction of the ball plate 11 or 13 is completed only by a rotation around the gravity axis, the single axis geometric errors of the X-axis, the Y-axis, and the Z-axis can be accurately identified without putting an excessive burden on an operator.

Especially in the second configuration, since the four-axis-control horizontal machining center having the B-axis that is the rotation axis that can rotate the table 3 around the normal vector of the upper surface of the table 3 is used, a sequence of measurements can be automatically performed. Accordingly, the identification of the single axis geometric errors of the X-axis, the Y-axis, and the Z-axis can be automatically performed without knowledge or measurement skills of a machine operator.

Next, Embodiment 2 is explained below.

Figure 8:
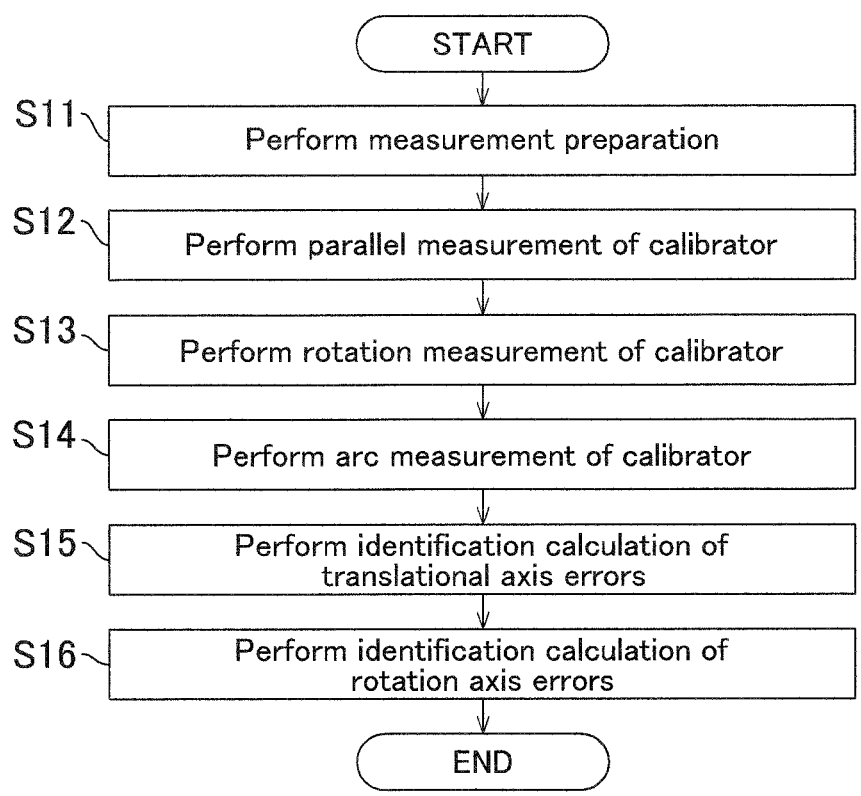
FIG. 8 is a flowchart of an error identification method of an embodiment 2.

A procedure of an error identification method of a fifth configuration of the disclosure will be described based on a flowchart in FIG. 8. The procedure will be described using the four-axis-control horizontal machining center of FIG. 1 as an example of a target machine tool.

Figure 2:
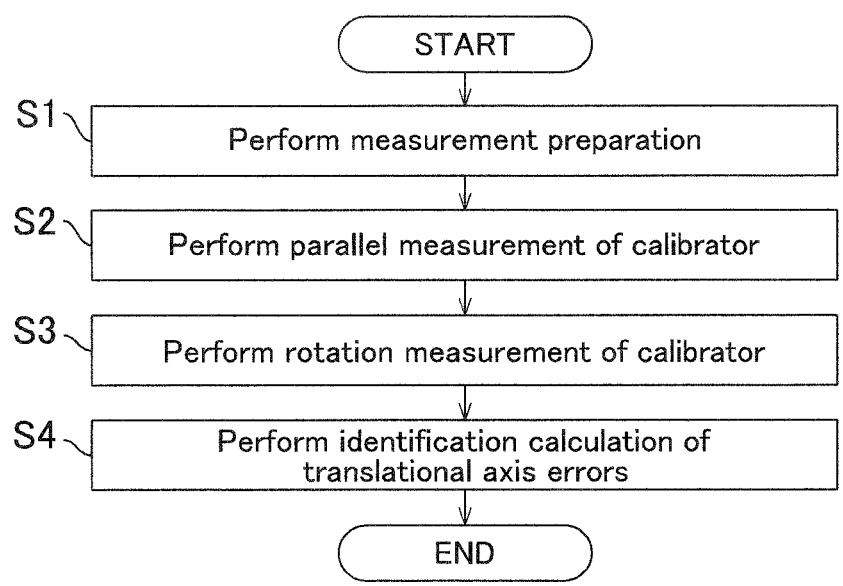
FIG. 2 is a flowchart of an error identification method of an embodiment 1.
Figure 9:
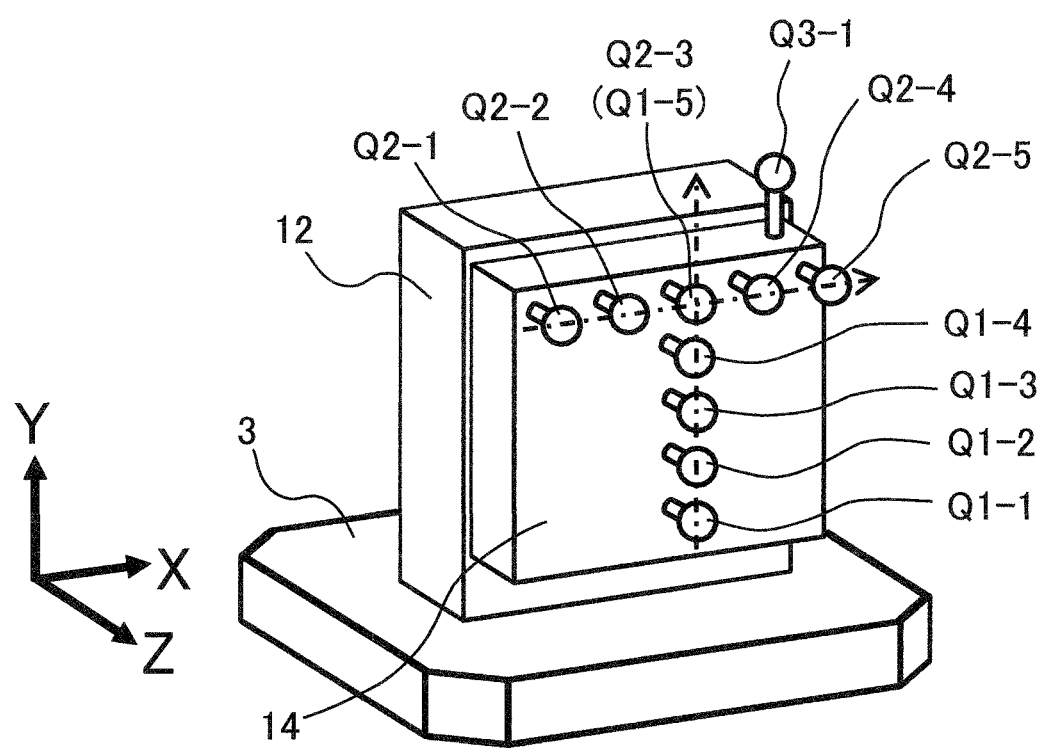
FIG. 9 is a schematic diagram of another configuration of a ball plate.

Since S11 that is a preparing step, S12 that is a parallel measuring step, and S13 that is a rotation measuring step are respectively identical to S1, S2, and S3 of the flowchart in FIG. 2, descriptions thereof are omitted. However, as a ball plate to be a measurement target, other than the ball plates 11 or 13 of the embodiment 1, a ball plate 14 illustrated in FIG. 9 can be used. The ball plate 14 is the one in which a sphere Q3-1 projecting upward from the end part of the X+ side is added on the upper surface of the ball plate 13 of FIG. 4.

Figure 10:
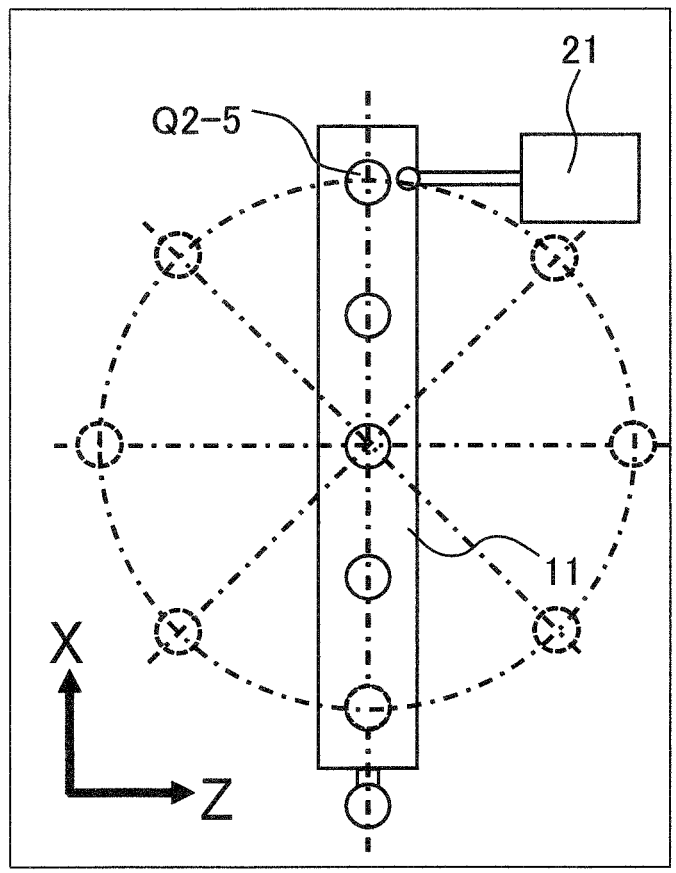
FIG. 10 is a schematic diagram of a position of a sphere of the ball plate in an arc measurement.

In S14, as illustrated in FIG. 10, the B-axis is sequentially indexed to a plurality of angles such that the spheres on the ball plate 11 draw arc trajectories to measure each center position of the sphere Q2-5. S14 is an arc measuring step.

Here, instead of measuring the sphere Q2-5, another sphere from Q2-1 to Q2-4 may be measured. A plurality of spheres may be measured. For the ball plate 14, the center position of the sphere Q3-1 is measured.

Since S15 is identical to S4 of the flowchart in FIG. 2, description thereof is omitted. S15 is a translational axis error identifying step.

In S16, the measured values of S14 and the identification values of the translational axis errors of S15 are used to perform the identification calculation of geometric errors of the rotation axis. S16 is an error identifying step.

Figure 11:
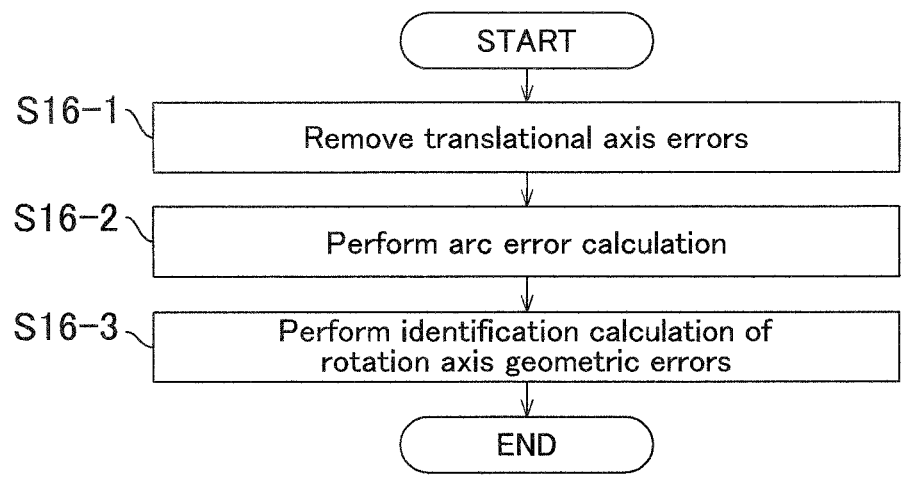
FIG. 11 is a detailed flowchart of an identification calculation of rotation axis geometric errors.

The details of S16 will be described based on a flowchart in FIG. 11.

In S16-1, influence of the geometric errors, namely, positioning errors and straightnesses of the X-axis, the Y-axis, and the Z-axis, and squarenesses between the respective axes of the translational axes identified in S15 is removed from the sphere center measured positions measured in S14.

A center position measured value vector of the sphere Q2-5 at a k-th indexed angle in the arc measurement is assumed to be PRk=(XRk, YRk, ZRk). A measured value vector after correcting the center position of each sphere CLk=(XLk, YLk, ZLk) in which the positioning errors of the X-axis, the Y-axis, and the Z-axis, the straightnesses of the X-axis and the Y-axis, and the squarenesses between the respective axes are removed is obtained by the following formulae.

$$XLk=XRk-fEXX\{XRk\}+EXY(YRk)-ECXY*YRk\}$$

$$YLk=YRk-\{EYX(XRk)+EYY(YRk)\}$$

$$ZLk=ZRk-\{EZX(XRk)+EZY(YRk)+KZ*ZRk+EAYZ*ZRk-EBZX*XRk\} \quad \text{[Math. 15]}$$

In S16-2, arc errors of respective sphere center position measured value groups measured by indexing the rotation axis so as to draw the arc trajectories in S14 are obtained. The arc errors are a radial error, and a lateral direction and a vertical direction of a center offset, which can be expressed by a zero-order coefficient of a Fourier coefficient, a first-order cosine coefficient, and a first-order sine coefficient, respectively.

The B-axis angle is indexed to βk (k=1 to n) to perform the measurement.

An axial direction error EAk, a radial direction error ERk, and a tangential direction error ETk in the arc measurement are obtained by the following formulae, where POk=(XOk, YOk, ZOk) denotes a command position of the center of the sphere Q2-5 at the k-th indexed angle, and VAk, VRk, and VTk respectively denote an axial direction vector, a radial direction vector, and a tangential direction vector of the B-axis.

$$EAk=(CLk-P0k)\cdot VAk$$

$$ERk=(CLk-P0k)\cdot VRk$$

$$ETk=(CLk-P0k)\cdot VTk \quad \text{[Math. 16]}$$

Relationships of EAk, ERk, and ETk with respect to the respective Fourier coefficients can be expressed by the following formulae, where A0A, A1A, and B1A denote Fourier coefficients of axial direction components, A0R, A1R, and B1R denote Fourier coefficients of radial direction components, and A0T, A1T, and B1T denote Fourier coefficients of tangential direction components. By solving the formulae as simultaneous equations of n formulae in the respective directions, the arc errors in the respective directions can be obtained.

$$EAk=A0A+A1A*\cos βk+B1A*\sin βk$$

$$ERk=A0R+A1R*\cos βk+B1R*\sin βk$$

$$ETk=A0T+A1T*\cos βk+B1T*\sin βk \quad \text{[Math. 17]}$$

In S16-3, the geometric errors of the rotation axis, namely, center errors and an inclination error of the rotation axis are obtained from the arc errors in the respective directions obtained in S16-2.

Relationships of the arc errors in the respective directions with respect to a B-axis center position X-direction error dXbz, a B-axis center position Z-direction error dZbz, a squareness between the B-axis and the Z-axis dAbz, and a squareness between the B-axis and the X-axis dCbz are expressed by the following formulae. Here, Hc is a center Z position of the sphere Q2-5, and Rc is a turning radius of the sphere Q2-5 in the arc measurement.

$$A1R=-dZbz-Hc*dAbz$$

$$B1R=-dXbz+Hc*dCbz$$

$$A1A=Rc*dAbz$$

$$B1A=-Rc*dCbz \quad \text{[Math. 18]}$$

By solving the above formulae, the geometric errors of the rotation axis can be obtained. Since the identified geometric errors of the rotation axis are identified by removing the influence of the geometric errors of the translational axes alone, they can be identified more accurately than a conventional method.

With the above configurations, in the four-axis-control horizontal machining center including the table 3 configured to secure a workpiece and/or a jig, the spindle head 2 configured to rotate a mounted tool around an axis line parallel to the upper surface of the table 3, the three X-axis, Y-axis, and Z-axis orthogonal to one another and configured to relatively move the spindle head 2 with respect to the table 3, and the B-axis (rotation axis) configured to rotate the table 3 around the normal vector of the upper surface of the table 3, the following advantages can be achieved by using a relatively inexpensive ball plates with the jig 11 to 14 (reference device) that do not have an inclination mechanism, the single axis geometric errors, namely, positioning errors and straightnesses of the X-axis, the Y-axis, and the Z-axis that are the translational axes can be identified. Since a change of the direction of the ball plates with the jig 11 to 14 is completed only by a rotation around the gravity axis, the single axis geometric errors of the X-axis, the Y-axis, and the Z-axis can be accurately identified without putting an excessive burden on an operator.

In particular, since the four-axis-control horizontal machining center in which the table 3 is turnable by the B-axis is used, in addition to the single axis geometric errors, namely, positioning errors and straightnesses of the X-axis, the Y-axis, and the Z-axis, the inter-axis geometric errors, namely, squarenesses between the X-axis, the Y-axis, and the Z-axis, center errors of the B-axis, and an inclination error of the B-axis can be simultaneously identified. Further, the accurate identification of the inter-axis geometric errors is allowed without being affected by the single axis geometric errors of the X-axis, the Y-axis, and the Z-axis. Furthermore, the simultaneous identification of the single axis geometric errors of the X-axis, the Y-axis, and the Z-axis and the inter-axis geometric errors can be automatically performed without knowledge or measurement skills of a machine operator.

As a modification example in common between the embodiments 1 and 2, a tool other than the touch trigger probe can be used as a position measurement sensor tool. A calibrator other than the ball plates of the above-described respective configurations can be employed. For example, the number of the spheres can increase and decrease appropriately.

The machine tool is not limited to the four-axis-control horizontal machining center of the above-described configurations.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An error identification method for a machine tool for identifying an error, wherein
    the machine tool includes a table configured to secure a workpiece and/or a jig, a spindle configured to rotate a mounted tool around an axis line parallel to an upper surface of the table, and three translational axes orthogonal to one another and configured to relatively move the spindle with respect to the table, wherein
    the error identification method comprises:
        installing a calibrator including a sphere row A in which a plurality of spheres are linearly aligned and a sphere row B in which a plurality of spheres are linearly aligned in a direction perpendicular to the sphere row A on the table such that the sphere row A and the sphere row B are approximately parallel to respective two of the translational axes and measuring positions of a plurality of spheres of the sphere row A and the sphere row B using a position measurement sensor tool mounted on the spindle;
        rotating the calibrator to a plurality of angles around a normal direction on the upper surface of the table to install on the table and measuring each position of the plurality of spheres of the sphere row A and the sphere row B using the position measurement sensor tool; and
        identifying an error of the translational axis based on measured values in the installing and the rotating.

2. The error identification method for the machine tool according to claim 1, wherein
    the identifying includes identifying a positioning error of the translational axis and a squareness error between the translational axes.

3. The error identification method for the machine tool according to claim 1, wherein
    the identifying includes identifying a positioning error and a straightness error of the two of the translational axes selected in the installing, a scaling component of a positioning error of one of the translational axes other than the two of the translational axes, and three squareness errors between the translational axes.

4. An error identification method for a machine tool for identifying an error, wherein
    the machine tool includes a table configured to secure a workpiece and/or a jig, a spindle configured to rotate a mounted tool around an axis line parallel to an upper surface of the table, three translational axes orthogonal to one another and configured to relatively move the spindle with respect to the table, and a rotation axis configured to rotate the table around a normal vector of the upper surface of the table, wherein
    the error identification method comprises:
        installing a calibrator including a sphere row A in which a plurality of spheres are linearly aligned and a sphere row B in which a plurality of spheres are linearly aligned in a direction perpendicular to the sphere row A on the table;
        firstly measuring positions of a plurality of spheres of the sphere row A and the sphere row B using a position measurement sensor tool mounted on the spindle, after indexing the rotation axis such that the sphere row A and the sphere row B are approximately parallel to respective two of the translational axes;
        secondary measuring each position of a plurality of spheres of the sphere row A and the sphere row B using the position measurement sensor tool, after indexing the rotation axis to a plurality of angles such that the sphere row A is non-parallel to any of the translational axes; and
        identifying an error of the translational axis based on measured values in the firstly measuring and the secondary measuring.

5. The error identification method for the machine tool according to claim 4, wherein
    the identifying includes identifying a positioning error of the translational axis and a squareness error between the translational axes.

6. The error identification method for the machine tool according to claim 4, wherein
    the identifying includes identifying a positioning error and a straightness error of the two of the translational axes selected in the firstly measuring, a scaling component of a positioning error of one of the translational axes other than the two of the translational axes, and three squareness errors between the translational axes.

7. A non-transitory computer-readable storage medium storing an error identification program for a machine tool for causing a numerical control unit of a machine tool to perform the error identification method for the machine tool according to claim 4, wherein
    the machine tool includes a table configured to secure a workpiece and/or a jig, a spindle configured to rotate a mounted tool around an axis line parallel to an upper surface of the table, three translational axes orthogonal to one another and configured to relatively move the spindle with respect to the table, and a rotation axis configured to rotate the table around a normal vector of the upper surface of the table.

8. A machine tool comprising:
    a table configured to secure a workpiece and/or a jig;
    a spindle configured to rotate a mounted tool around an axis line parallel to an upper surface of the table;

three translational axes orthogonal to one another and configured to relatively move the spindle with respect to the table; and a rotation axis configured to rotate the table around a normal vector of the upper surface of the table, wherein the machine tool includes:

a parallel measuring unit, in a state where a position measurement sensor tool is mounted on the spindle and a calibrator including a sphere row A in which a plurality of spheres are linearly aligned and a sphere row B in which a plurality of spheres are linearly aligned in a direction perpendicular to the sphere row A is installed on the table, the parallel measuring unit being configured to index the rotation axis such that the sphere row A and the sphere row B are approximately parallel to respective two of the translational axes and measure positions of a plurality of spheres of the sphere row A and the sphere row B using the position measurement sensor tool;

a rotation measuring unit configured to index the rotation axis to a plurality of angles such that the sphere row A is non-parallel to any of the translational axes and measure each position of a plurality of spheres of the sphere row A and the sphere row B using the position measurement sensor tool; and a translational axis error identifying unit configured to identify an error of the translational axis based on measured values by the parallel measuring unit and the rotation measuring unit.

9. An error identification method for a machine tool for identifying an error, wherein the machine tool includes a table configured to secure a workpiece and/or a jig, a spindle configured to rotate a mounted tool around an axis line parallel to an upper surface of the table, three translational axes orthogonal to one another and configured to relatively move the spindle with respect to the table, and a rotation axis configured to rotate the table around a normal vector of the upper surface of the table, wherein the error identification method comprises:

installing a calibrator including a sphere row A in which a plurality of spheres are linearly aligned and a sphere row B in which a plurality of spheres are linearly aligned in a direction perpendicular to the sphere row A on the table;

firstly measuring positions of a plurality of spheres of the sphere row A and the sphere row B using a position measurement sensor tool mounted on the spindle, after indexing the rotation axis such that the sphere row A and the sphere row B are approximately parallel to respective two of the translational axes;

secondly measuring each position of a plurality of spheres of the sphere row A and the sphere row B using the position measurement sensor tool, after indexing the rotation axis to a plurality of angles such that the sphere row A is non-parallel to any of the translational axes; and thirdly measuring each center position of at least one sphere of the calibrator, after indexing the rotation axis sequentially to a plurality of angles such that a sphere of the calibrator draws an arc trajectory; and identifying an error of the translational axis and an error of the rotation axis based on measured values in the firstly measuring, the secondly measuring, and the thirdly measuring.

10. The error identification method for the machine tool according to claim 9, wherein the identifying includes identifying a positioning error of the translational axis, a squareness error between the translational axes, and a center position error of the rotation axis.

11. The error identification method for the machine tool according to claim 9, wherein the identifying includes identifying a positioning error and a straightness error of the two of the translational axes selected in the firstly measuring, a scaling component of a positioning error of one of the translational axes other than the two of the translational axes, three squareness errors between the translational axes, a center position error of the rotation axis, and an inclination error of the rotation axis.

12. A non-transitory computer-readable storage medium storing an error identification program for a machine tool for causing a numerical control unit of a machine tool to perform the error identification method for the machine tool according to claim 9, wherein the machine tool includes a table configured to secure a workpiece and/or a jig, a spindle configured to rotate a mounted tool around an axis line parallel to an upper surface of the table, three translational axes orthogonal to one another and configured to relatively move the spindle with respect to the table, and a rotation axis configured to rotate the table around a normal vector of the upper surface of the table.

13. A machine tool comprising:

a table configured to secure a workpiece and/or a jig;

a spindle configured to rotate a mounted tool around an axis line parallel to an upper surface of the table;

three translational axes orthogonal to one another and configured to relatively move the spindle with respect to the table; and a rotation axis configured to rotate the table around a normal vector of the upper surface of the table, wherein the machine tool includes:

a parallel measuring unit, in a state where a position measurement sensor tool is mounted on the spindle and a calibrator including a sphere row A in which a plurality of spheres are linearly aligned and a sphere row B in which a plurality of spheres are linearly aligned in a direction perpendicular to the sphere row A is installed on the table, the parallel measuring unit being configured to index the rotation axis such that the sphere row A and the sphere row B are approximately parallel to respective two of the translational axes and measure positions of a plurality of spheres of the sphere row A and the sphere row B using the position measurement sensor tool;

a rotation measuring unit configured to index the rotation axis to a plurality of angles such that the sphere row A is non-parallel to any of the translational axes and measure each position of a plurality of spheres of the sphere row A and the sphere row B using the position measurement sensor tool;

an arc measuring unit configured to index the rotation axis sequentially to a plurality of angles such that a sphere of the calibrator draws an arc trajectory and measure each center position of at least one sphere of the calibrator; and an error identifying unit configured to identify an error of the translational axis and an error of the rotation axis based on measured values by the parallel measuring unit, the rotation measuring unit, and the arc measuring unit.

\* \* \* \* \*